(12) United States Patent
Ziegler

(10) Patent No.: US 7,824,762 B2
(45) Date of Patent: Nov. 2, 2010

(54) NONWOVEN FIBROUS MAT LAMINATE

(75) Inventor: Paul Francis Ziegler, Bowling Green, OH (US)

(73) Assignee: Johns Manville, Denver, CO (US)

( * ) Notice: Subject to any disclaimer, the term of this patent is extended or adjusted under 35 U.S.C. 154(b) by 191 days.

(21) Appl. No.: 11/075,202

(22) Filed: Mar. 8, 2005

(65) Prior Publication Data

US 2006/0204737 A1  Sep. 14, 2006

(51) Int. Cl.
*B32B 5/26* (2006.01)
(52) U.S. Cl. .................. 428/212; 428/219; 428/340; 442/390; 442/391; 442/398
(58) Field of Classification Search ............... 442/390, 442/391, 219, 398; 428/212, 219, 340
See application file for complete search history.

(56) References Cited

U.S. PATENT DOCUMENTS

| 4,112,174 | A |   | 9/1978 | Hannes et al. |
| 4,418,113 | A | * | 11/1983 | Kawashima et al. ........ 428/213 |
| 4,681,802 | A |   | 7/1987 | Gaa et al. |
| 4,810,576 | A |   | 3/1989 | Gaa et al. |
| 5,001,005 | A |   | 3/1991 | Blanpied |
| 5,130,197 | A | * | 7/1992 | Temple ........................ 428/378 |
| 5,547,743 | A |   | 8/1996 | Rumiesz, Jr. et al. |
| 5,965,257 | A |   | 10/1999 | Ahluwalia |
| 6,093,485 | A |   | 7/2000 | Jaffee |
| 6,187,697 | B1 | * | 2/2001 | Jaffee et al. ................. 442/149 |
| 6,432,482 | B1 |   | 8/2002 | Jaffee et al. |
| 2005/0082721 | A1 | * | 4/2005 | Haque et al. ................. 264/324 |

FOREIGN PATENT DOCUMENTS

WO   WO 0226463 A2 * 4/2002

* cited by examiner

*Primary Examiner*—Elizabeth M Cole
(74) *Attorney, Agent, or Firm*—Robert D. Touslee

(57) ABSTRACT

A laminate is disclosed that comprises at least two layers of fibrous nonwoven mats in which the majority of the fibers in at least one of the mats are glass fibers, the layers being bonded together with an adhesive, needling, stitch bonding or a mixture of two or more of these bonding techniques, one of the mats having a basis weight of at least 3 lbs. per 100 sq. ft and at least 1.5 times the basis wt. of the other mat. The laminates are especially useful in making acoustical panels for office partitions.

33 Claims, No Drawings

NONWOVEN FIBROUS MAT LAMINATE

The present invention involves laminates made by bonding fibrous nonwoven mats, including at least one glass fiber mat, together with an adhesive layer. These laminates are particularly useful in the manufacture of modular wall panels.

BACKGROUND

It is known to make reinforcing nonwoven mats from fibers and to use these mats as substrates in the manufacture of a large number of products including structural panels, see U.S. Pat. No. 5,547,743. Methods of making nonwoven mats are also known, such as conventional wet laid processes described in U.S. Pat. Nos. 4,112,174, 4,681,802 and 4,810,576, the disclosures of which are hereby incorporated herein by reference. In these processes a slurry of glass fiber is made by adding fiber to a typical white water in a pulper to disperse the fiber in the white water forming a slurry having a fiber concentration of about 0.2-1.0 weight %, metering the slurry into a flow of white water to dilute the fiber concentration to 0.1 or below, and depositing this mixture on to a moving screen forming wire to dewater and form a wet nonwoven fibrous mat.

This wet nonwoven web of fiber is then transferred to a second moving screen in-line with the forming screen and run through a binder application saturating station where an aqueous binder mixture, such as an aqueous urea formaldehyde (UF) resin based binder mixture, is applied to the mat in any one of several known ways. The binder-saturated mat is then run over a suction section while still on the moving screen to remove excess binder. The wet mat is then transferred to a wire mesh moving belt and run through an oven to dry the wet mat and to cure (polymerize) the UF based resin binder which bonds the fibers together in the mat. Preferably, the aqueous binder solution is applied using a curtain coater or a dip and squeeze applicator, but other methods of application such as spraying are also known.

In the drying and curing oven the mat is subjected to temperatures up to 450 or 500 degrees F. or higher for periods usually not exceeding 1-2 minutes and as little as a few seconds. Alternative forming methods for nonwoven fiber mats include the use of well known processes of cylinder forming, continuous strand mat forming which lays continuous strands of glass fibers in overlapping swirls, and "dry laying" using carding or random fiber distribution.

UF resins, usually modified with one or more of acrylic, styrene butadiene, or vinyl acetate resins, are most commonly used as a binder for glass fiber mats because of their suitability for the applications and their relatively low cost. Melamine formaldehyde resins are sometimes used for higher temperature and/or chemical resistant applications. To improve the toughness of the mats, a combination of higher mat tear strength and mat flexibility, which is needed to permit higher processing speeds on roofing product manufacturing lines and for maximum roofing product performance on the roofs and in other applications, it is common to modify or plasticize the UF resins as described above. The binder content of these finished mats typically are in the range of 15 to 25 weight percent or higher, based on the dry weight of the mat. It is also known to use other types of aqueous latex binders like acrylics, polyester, polyvinyl acetate, polyvinyl alcohol and other types of resinous binders alone or in combination.

Nonwoven fibrous mats are sometimes used as facers for glass fiber insulation blanket and for pressed glass fiber insulation boards and duct liner, the glass fibers in the insulation being bonded together with a binder, typically phenolic resin, that when cured has a yellow, pink, or tan color. Often it is desirable that the mat facer hide the yellow, or other color of the cured insulation substrate, presenting a white surface, but normal glass fiber mat does not cover up the color to the desired extent due to the light transmission of the 10-16 glass fibers normally used in the mat. It is possible to increase the hiding power by adding small diameter glass microfibers, having average diameters of about 2 microns or less, to the mat but this adds considerable cost to the mat, makes the mat weaker and fuzzier and increases the amount of scrap when making this mat due to wrinkling problems.

It is also known, as illustrated by U.S. Pat. No. 5,965,257 to make a mat having zero bleed through when used as a facer mat in the manufacture of foam insulation by heavily coating a dry, bonded mat on a separate coating line. This patent teaches a coating composition comprising one or more fillers and a binder like acrylic latex. It is also known to use off-line coating to make mats having good hiding properties, but off line coating is expensive, often producing a mat that is not cost competitive with alternative facers like kraft fiber papers and plastic films. Although glass fiber, and sometimes polymer fiber, nonwoven mats are superior in other aspects such as durability, thermal and humidity stability, they often loose out to the lower cost alternatives.

It is also disclosed in U.S. Pat. No. 5,001,005 and U.S. Pat. No. 5,965,257 to make a glass fiber mat containing 60-90 weight percent glass fibers 10-40 percent of non-glass filler material and 1-30 percent of a non-asphaltic binder to use as a facer for foam boards. The filler materials are bonded to the glass fibers with the binder and prevent bleed through of the foam precursor materials when the latter is placed in contact with the mat prior to blowing.

SUMMARY OF THE INVENTION

The invention is a laminate comprising at least two layers of nonwoven fiber mats, each mat comprising glass fibers, with a layer of adhesive between the at least two layers of nonwoven mats. The laminate is useful for acoustical and low thermal insulation and other functions and is particularly useful in the manufacture of a tackable or non-tackable acoustical panel for use in commercial interior applications.

Nonwoven mats used in the laminate invention can have basis weights in the range of about 0.5 to about 6 lbs. per 100 sq. feet and comprise glass fibers and can also comprise polymer fibers and mixtures, the glass fibers and other fibers being bonded together with a dry and cured binder system containing a conventional resin binder, typically a water soluble binder like melamine formaldehyde, furan, polyvinyl alcohol, hydroxyl ethyl cellulose, carboxyl methyl cellulose, cellulose gums, polyvinyl pyrilidone, urea formaldehyde alone or modified with one or more plasticizer resins in a known manner, polyvinyl acetate homopolymer, polyacrylic acid solution polymer, and other known mat binders. Most typically at least one of the mats will contain a melamine binder to provide good stiffness in the mat(s) and laminate. Instead of the fibers being bonded with a resin binder, the fibers can be bonded together by needling in a known manner. The nonwoven mats can also comprise an opacifier like a clay, powdered limestone, glass or ceramic microspheres, and other conventional white pigments. Most typically, the mats will be white or off-white, especially the surfaces on the exterior of the laminate, but colorants can be included in the mats, or in a coating on the mat(s) if desired.

Typically glass fiber is used, typically K or M diameter fiber, fibers having an average fiber diameter of at least about 12 microns, but other fibers including synthetic fibers like nylon, polyester, polyethylene, and other fiber diameters can be present in amounts up to at least about 10-25 wt. percent of the fibers. A small amount of the fibers can even be bleached cellulosic fibers or fibers derived from a cellulosic material.

Typically one of the nonwoven mats in the laminate will have a substantially higher basis weight, weight per unit area of mat, than the other nonwoven mat. The basis weight of the nonwoven mats in the laminate are in the range of about 0.5 to about 6 lbs. per 100 square feet of mat with one of the nonwoven mats having a basis weight in the range of about 1.5 to about 3 times the basis weight of the other nonwoven mat. Most typically, one of the nonwoven mats has a basis weight that is at least about 1.7 times the basis weight another mat in the laminate.

At least two of the above-described fibrous mats are bonded together with a resinous film, most typically a thermoplastic film such as polyethylene film. Any method of bonding the mats together is suitable such as using other adhesives in film form or in viscous liquid form as well as stitch bonding and needling with or without a layer of adhesive between the mats. The adhesive can also contain thermoplastic particles that will melt under heat, with or without pressure, to form an adhesive bond holding the mats together in the laminate. The thermoplastic particles can already be bonded to the mats using a process of manufacturing the mat disclosed in U.S. Pat. No. 6,187,697, which disclosure is herein incorporated by reference. A liquid adhesive can also be sprayed onto one or both mats and the mats bonded together using either ambient or elevated temperature conditions in a known manner. The bond can also be accomplished by the resin bonding the fibers together when that resin is only cured to a B stage in at least one of the mats, but most typically in at least two of the mats in the laminate.

The laminate can comprise two or more layers of fibrous nonwoven mat, but more typically comprises three or more layers of fibrous nonwoven mat. The thickness of the laminate, before applying a fabric cover to one or both sides of the laminate, can be a matter of choice, but typically will be in the range of about 160 to about 180 mils, more typically from about 150 to about 200 mils and can be up to about 350 mils.

The laminates of the invention are less costly to manufacture than prior laminates of the same hiding power because they contain less costly larger diameter fibers than was necessary in prior mats to obtain the same hiding characteristics. These mats are particularly suited for use in the manufacture of thermal and/or sound insulation composites, tack board, a component of office module construction, wallboard, and other like products. The present invention also includes laminates comprising a layer of insulation glass fibers bonded together with a binder having a color other than white, usually yellow or tan, and having bonded to at least one face a nonwoven fiber glass mat in accordance with the above described inventive mat.

The present invention also includes a process of making the laminates described above by bonding two fibrous mats as described above together in the manner described above, one of the mats having a basis weight that is at least about 1.5 times the basis weight of another mat in the laminate.

When the word "about" is used herein it is meant that the amount or condition it modifies can vary some beyond that stated so long as the advantages of the invention are realized. Practically, there is rarely the time or resources available to very precisely determine the limits of all the parameters of ones invention because to do would require an effort far greater than can be justified at the time the invention is being developed to a commercial reality. The skilled artisan understands this and expects that the disclosed results of the invention might extend, at least somewhat, beyond one or more of the limits disclosed. Later, having the benefit of the inventors disclosure and understanding the inventive concept, the objectives of the invention and embodiments disclosed, including the best mode known to the inventor, the inventor and others can, without inventive effort, explore beyond the limits disclosed using only ordinary skill to determine if the invention is realized beyond those limits, and when embodiments are found to be without any unexpected characteristics, those embodiments are within the meaning of the term about as used herein. It is not difficult for the artisan or others to determine whether such an embodiment is either as expected or, because of either a break in the continuity of results or one or more features that are significantly better than reported by the inventor, is surprising and thus an unobvious teaching leading to a further advance in the art.

DETAILED DESCRIPTION OF THE INVENTION

Laminates of the present invention contain mats that typically contain about 60 to about 90 wt. percent fiber, preferably about more typically about 65 to about 85 wt. percent and most typically from about 70 to about 85, weight percent fibers. The mats also typically contain about 10 to about 40 weight percent cured binder, more typically about 12 to about 35 wt. percent and most typically about 13 to about 32 wt. percent binder holding the fibers together, exclusive of any additives like pigments, etc. as described above. The majority of the fibers are preferably glass fibers, but other fibers can be present. The glass fibers which can be used to make mats can have various fiber diameters and lengths dependent on the strength and other properties desired in the mat as is well known. Typically the majority of the glass fibers have diameters in the range of about 8 up to about 23 microns, with the major portion of the fiber being more typically in the range of about 10 to 19 microns and most typically in the range of about 12 to 17 microns.

The glass fibers can be E glass, C glass, T glass, S glass or any known glass fiber of good strength and durability in the presence of moisture. Normally the glass fibers used all have about the same target length, such as 0.25, 0.5, 0.75, 1 or 1.25 inch, but fibers of different lengths and different average diameters can also be used to get different characteristics in a known manner. Fibers up to about 4 inches or longer in length can be used in a wet process for making fiber glass mats and even longer fibers can be used in some dry processes like needling, lapping or stitch bonding.

While the majority of the fibers used in the present invention are glass fibers, a minor portion of non-glass fibers can also be used, such as cellulosic fibers including wood pulp of all kinds, cotton linters, cellulose derivatives such as cellulose triacetate, rayon, etc. Man made organic fibers such as Nylon™, polyester, polyethylene, polypropylene, etc. can also be used instead of cellulose fibers in any various blends with one or more cellulosic fibers. The fibers in the mats are bonded together as described earlier.

Processes for making nonwoven fiber glass mats are well known and some of them are described in U.S. Pat. Nos. 4,112,174, 4,681,802 and 4,810,576, which references are hereby incorporated into this disclosure by reference, but any known method of making nonwoven mats can be used. The preferred technique for the making of mats of the present invention is forming a dilute aqueous slurry of fibers and depositing the slurry onto an inclined moving screen forming wire to dewater the slurry and form a wet nonwoven fibrous mat, on machines like a Hydroformer™ manufactured by Voith-Sulzer of Appleton, WS, or a Deltaformer™ manufactured by Valmet/Sandy Hill of Glenns Falls, N.Y. The examples disclosed herein were made on a pilot scale model of a wet forming machine, binder applicator, and oven that produces a mat very similar to a mat that would be produced from the same slurry and binder on a production sized Voith-Sulzer Deltaformer™ with a curtain coater binder applicator and a flat bed, permeable conveyor type convection dryer.

After forming a web from the fibrous slurry, the wet, unbonded fibrous nonwoven web or mat is then transferred to a second moving screen running through a binder application saturating station where the binder, preferrably resin based, in aqueous solution is applied to the mat. The excess binder is removed, and the wet mat is transferred to a moving permeable belt that runs through a convection oven where the unbonded, wet mat is dried and cured, bonding the fibers together in the mat. In production, the dry, cured mat is then usually wound into rolls and packaged such as by stretch or shrink wrapping or by putting into a plastic bag to keep out moisture and dirt, etc.

Typically, when an aqueous binder solution, emulsion, or slurry is applied using a curtain coater or a dip and squeeze applicator, the wet, bindered mat is run through a drying and curing oven where the mat is heated to temperatures of up to about 500 degrees F. to dry the mat and cure the resin binder. The treatment temperature can vary from about 250 degrees F. to as high as will not embrittle or deteriorate the binder, for periods usually not exceeding 1 or 2 minutes and frequently less than 40 seconds, preferably significantly less than 30 seconds.

A modified method of making non-woven mats is disclosed in U.S. Pat. No. 6,432,482, the disclosure incorporated herein by reference. In this method a coating can be applied to the wet web by adding particles to the aqueous binder, the particle size of the particles being such that all or all but a few percent, like up to 4 wt. percent of the particles, remain on top of the mat when the aqueous binder is applied to the mat. The particles being coated with the aqueous binder are then adhered to the top of the mat as a coating when the mat is dried and heated to conventional curing temperatures. This method is used in the invention to apply thermoplastic adhesive particles to one surface of at least one of the mats used in making the laminates of the invention to form a thermoplastic coating on the mat that will later bond two or more layers of mat together under heat and some pressure. Another method of applying thermoplastic particles to the top of the mat is to sprinkle dry thermoplastic particles onto the top of the wet, bindered mat prior to drying the mat and curing the mat binder. In both methods the thermoplastic particles will be bonded to the mat by the aqueous binder and the adhesion of the particles to the mat and each other can be further enhanced by at least partially melting the thermoplastic particles in the downstream end of the mat oven after the water has been removed from the mat, during the curing stage. Another method of making a mat that will bond to another mat is to only cure the bonding resin to a B stage in the mat manufacturing process and this can be used in the invention. This method is disclosed in U.S. Pat. No. 6,093,485, the disclosure herein incorporated by reference. While this latter patented process uses an acrylic resin, any resin that can be B staged is suitable for providing an adhesive to bond the mats together, but non-formaldehyde or low formaldehyde content resins are most typically used in the invention.

Example 1

A laminate was made by bonding the following layers together under sufficient heat to melt the film adhesive layers and under sufficient load to keep the layers in close contact with the adjacent layer:

First layer—Johns Manville 8221 glass fiber nonwoven mat

Second layer—1 mil thick polyethylene film

Third layer—Johns Manville 5045 glass fiber nonwoven mat

Fourth layer—1 mil thick polyethylene film

Fifth layer—Johns Manville 8221 glass fiber nonwoven mat

The glass fiber mats are available from Johns Manville Corp. of Denver, Colo., were made by the wet forming process described and had the following properties and ingredients:

| Ingredient/Property | 8221 | 5045 |
|---|---|---|
| Glass fiber (M 117 -1 inch long)* wt. % | 72 | 84 |
| Polyester fiber (1.4 denier × ¼ inch long) wt. % | 8 | 0 |
| Astromel ™** CR1, Melamine resin solution wt. % | 0 | 16 |
| PSET ™*** Polyacrylic acid binder solution | 20 | 0 |
| Basis Weight (lbs. per 100 sq. ft.) Nominal/range | 2.4/2.3-2.6 | 4.5/4.1-4.9 |
| Thickness (mils) Nominal/range | 35/33-37 | 80/65-95 |
| MD + CMD Tensile strength per 3 in. width MD (lbs.) | 150 | 280 |

*M 117 fiber is a glass fiber product available from Johns Manville Corp. of Denver, CO. The fiber is E glass fiber having a nominal average fiber diameter of about 16 microns. This fiber is used widely in wet forming processes throughout the industry to make nonwoven mats.
**Astromel ™ CR1 is an aqueous melamine solution polymer mat binder available from the Borden Chemical of.
***PSET ™ is an aqueous polyacrylic acid solution polymer available from the Rhom & Haas Company of Philadelphia, PA.

The nonwoven mats used above were dry and the resin binder in each had been cured in a conventional manner by drying and heating for a several seconds at a temperature sufficient to soften the resin so that it flowed into the fiber crossover locations and then set or froze to lock the fibers together. The resultant laminate had a thickness of about 150 mils and had the rigidity and other characteristics needed for making acoustical panels for office partitions and other uses.

Example 2

Another laminate was made in the same manner as used in Example 1 except that a Johns Manville 5048 glass fiber nonwoven mat was substituted for the 5045 mat used in Example 1. The laminate was made by bonding the following layers together under sufficient heat to melt the film adhesive layers and under sufficient load to keep the layers in close contact with the adjacent layer:

First layer—Johns Manville 8221 glass fiber nonwoven mat

Second layer—1 mil thick polyethylene film

Third layer—Johns Manville 5048 glass fiber nonwoven mat

Fourth layer—1 mil thick polyethylene film

Fifth layer—Johns Manville 8221 glass fiber nonwoven mat

The glass fiber mats are available from Johns Manville Corp. of Denver, Colo., were made by the wet forming process described and had the following properties and ingredients:

| Ingredient/Property | 8221 | 5048 |
|---|---|---|
| Glass fiber (M 117 -1 inch long) wt. % | 72 | 84 |
| Polyester fiber (1.4 denier × ¼ inch long) wt. % | 8 | 0 |
| Astromel ™ CR1, Melamine resin solution wt. % | 0 | 16 |
| PSET ™ Polyacrylic acid binder solution | 20 | 0 |
| Basis Weight (lbs. per 100 sq. ft.) Nominal/range | 2.4/2.3-2.6 | 4.8/4.4-5.2 |
| Thickness (mils) Nominal/range | 35/33-37 | 85/65-95 |
| MD + CMD Tensile strength per 3 in. width MD (lbs.) | 150 | 285 |

The nonwoven mats used above were dry and the resin binder in each had been cured in a conventional manner by drying and heating for a several seconds at a temperature sufficient to soften the resin so that it flowed into the fiber crossover locations and then set or frozen to lock the fibers together. The resultant laminate had a thickness of about 157 mils and had the rigidity and other characteristics needed for making acoustical panels for office partitions and other uses.

Example 3

A laminate was made using the same procedure used in Example 2 except the third or central layer of the laminate was a glass fiber mat using the same binder used in the 8221 mat instead of the melamine binder. The laminate was made by bonding the following layers together under sufficient heat to melt the film adhesive layers and under sufficient load to keep the layers in close contact with the adjacent layer:

First layer—Johns Manville 8221 glass fiber nonwoven mat

Second layer—1 mil thick polyethylene film

Third layer—Johns Manville 5045 or 5048 glass fiber nonwoven mat

Fourth layer—1 mil thick polyethylene film

Fifth layer—Johns Manville 8221 glass fiber nonwoven mat

The glass fiber mats are available from Johns Manville Corp. of Denver, Colo., were made by the wet forming process described and had the following properties and ingredients:

| Ingredient/Property | 8221 | 5048 |
|---|---|---|
| Glass fiber (M 117 -1 inch long) wt. % | 72 | 84 |
| Polyester fiber (1.4 denier × ¼ inch long) wt. % | 8 | 0 |
| PSET ™ Polyacrylic acid binder solution | 20 | 16 |
| Basis Weight (lbs. per 100 sq. ft.) Nominal/range | 2.4/2.3-2.6 | 4.8/4.4-5.2 |
| Thickness (mils) Nominal/range | 35/33-37 | 85/65-95 |
| MD + CMD Tensile strength per 3 in. width MD (lbs.) min. | 150 | 200 |

The nonwoven mats used above were dry and the resin binder in each had been cured in a conventional manner by drying and heating for a several seconds at a temperature sufficient to soften the resin so that it flowed into the fiber crossover locations and then set or froze to lock the fibers together. The resultant laminate had a thickness of about 158 mils and had the rigidity and other characteristics needed for making acoustical panels for office partitions and other uses.

Example 4

A laminate was made using the procedure used in Example 1 except that the mat used in the first layer was a mat containing K or 13 micron average diameter glass fibers instead of M or 16 microns. The laminate was made by bonding the following layers together under sufficient heat to melt the film adhesive layers and under sufficient load to keep the layers in close contact with the adjacent layer:

First layer—Johns Manville 8235 glass fiber nonwoven mat

Second layer—1 mil thick polyethylene film

Third layer—Johns Manville 5048 glass fiber nonwoven mat

Fourth layer—1 mil thick polyethylene film

Fifth layer—Johns Manville 8221 glass fiber nonwoven mat

The glass fiber mats are available from Johns Manville Corp. of Denver, Colo., were made by the wet forming process described and had the following properties and ingredients:

| Ingredient/Property | 8221 | 8235 | 5048 |
|---|---|---|---|
| Glass fiber (M 117 -1 inch long) wt. % | 72 | 0 | 84 |
| Glass fiber (K-117-0.75 in. long) wt. % | | 72 | |
| Polyester fiber (1.4 denier × ¼ inch long) wt. % | 8 | 8 | 0 |
| Astromel ™ CR1, Melamine resin solution wt. % | 0 | 0 | 16 |
| PSET ™ Polyacrylic acid binder solution | 20 | 20 | 0 |
| Basis Weight (lbs. per 100 sq. ft.) Nominal/range | 2.4/ 2.3-2.6 | 2.45/ 2.3-2.6 | 4.8/ 4.4-5.2 |
| Thickness (mils) Nominal/range | 35/ 33-37 | 35 | 85/ 65-95 |
| MD + CMD Tensile strength per 3 in. width MD (lbs.) | 150 | 150 | 285 |

The nonwoven mats used above were dry and the resin binder in each had been cured in a conventional manner by drying and heating for a several seconds at a temperature sufficient to soften the resin so that it flowed into the fiber crossover locations and then set or froze to lock the fibers together. The resultant laminate had a thickness of about 150 mils and had the rigidity and other characteristics needed for making acoustical panels for office partitions and other uses. The surface of the exposed layer of 8235 mat was smoother than the surface of the exposed 8221 mat and is the surface used for covering with a paint or fabric.

If it is desired to cover both large surfaces with a fabric, paint or other decorative material, the laminate can be made using a mat similar to 8235 in both the First and Fifth layers.

The noteworthy properties of this laminate compared to previous laminates are:
  Has low formaldehyde content, or is formaldehyde-free.
  Is whiter than the previous laminates.
  Is more uniform in thickness and surface quality.

Several most typical embodiments of the invention have been set forth above, but having the benefit of this disclosure; many other modifications will be obvious to the ordinary artisan. All such embodiments not showing unexpected results naturally are enabled by, and are a result of, the invention and are intended to be included in the scope of the following claims.

The invention claimed is:

1. A laminate comprising at least two layers of fibrous nonwoven mats bonded together with a thermoplastic resinous film, the fibrous nonwoven mats comprising about 60 to about 90 wt. percent of fibers and about 16 to about 32 wt. percent of a cured resin binder locking the fibers in each of the fibrous nonwoven mats together at the fiber crossover locations in the fibrous nonwoven mats, the binder selected from a group consisting of polyacrylic acid solution polymer and melamine solution polymer, the majority of the fibers in each of the at least two fibrous nonwoven mats being glass fibers having a fiber diameter of at least about 12 microns and having lengths in the range of about 0.25 to about 1.25 inches, the at least two layers of fibrous nonwoven mats bonded together with the thermoplastic resinous film between each of the two layers of fibrous nonwoven mats, the thermoplastic resinous film being thermoplastic and of a different polymer than the polymer or polymers in the cured resin binder bonding the fibers together in said fibrous nonwoven mats, each of the fibrous nonwoven mats having a basis weight in the range of about 0.5 to about 6 lbs. per 100 sq. feet, one of the fibrous nonwoven mats having a basis weight of at least about 4.1 lbs. per 100 sq. ft. and in the range of about 1.5 times to about 3 times the basis weight of another fibrous nonwoven mat in the laminate, the thickness of the laminate being at least about 150 mils, a bottom or top layer of the laminate being a fibrous nonwoven mat comprised of at least about 70 wt. percent glass fibers and about 6 to about 10 wt. percent polymer fibers.

2. The laminate of claim 1 wherein the basis weight of one of the mats is at least 1.7 times the basis weight of another mat in the laminate.

3. The laminate of claim 1 wherein the majority of the glass fibers in at least one of the mats have a fiber diameter of at least about 15 microns.

4. The laminate of claim 2 wherein the majority of the glass fibers in at least one of the mats have a fiber diameter of at least about 15 microns.

5. The laminate of claim 1 wherein the resinous film is a thermoplastic polyethylene.

6. The laminate of claim 2 wherein the resinous film is a thermoplastic polyethylene.

7. The laminate of claim 3 wherein the resinous film is a thermoplastic polyethylene.

8. The laminate of claim 4 wherein the resinous film is a thermoplastic polyethylene.

9. The laminate of claim 1 wherein at least one of the mats also contains non-glass fibers selected from a group consisting of polymer fibers, ceramic fibers, mineral fibers, carbon fibers, cellulose or cellulosic fibers, and mixtures thereof.

10. The laminate of claim 2 wherein at least one of the mats also contains non-glass fibers selected from a group consisting of polymer fibers, ceramic fibers, mineral fibers, carbon fibers, cellulose or cellulosic fibers, and mixtures thereof.

11. The laminate of claim 3 wherein at least one of the mats also contains non-glass fibers selected from a group consisting of polymer fibers, ceramic fibers, mineral fibers, carbon fibers, cellulose or cellulosic fibers, and mixtures thereof.

12. The laminate of claim 4 wherein at least one of the mats also contains a minor portion, less than a majority of the fibers in the mat, of non-glass fibers selected from a group consisting of polymer fibers, ceramic fibers, mineral fibers, carbon fibers, cellulose or cellulosic fibers, and mixtures thereof.

13. The laminate of claim 8 wherein at least one of the mats also contains non-glass fibers selected from a group consisting of polymer fibers, ceramic fibers, mineral fibers, carbon fibers, cellulose or cellulosic fibers, and mixtures thereof.

14. A laminate comprising at least three layers of fibrous nonwoven mats comprising about 60 to about 90 wt. percent of fibers and about 16 to about 32 wt. percent of a cured resin binder locking the fibers in each of the nonwoven mats together at the fiber crossover locations in the fibrous nonwoven mats, a binder selected from a group consisting of polyacrylic acid solution polymer and melamine solution polymer, the majority of the fibers in each of the at least three fibrous nonwoven mats being glass fibers having lengths in the range of about 0.25 to about 1.25 inches, the three layers of fibrous nonwoven mats being bonded together with a resinous film between each of the layers of fibrous nonwoven mats, the resinous film being thermoplastic and of a different polymer than the polymer or polymers in the cured resin binder bonding the fibers together in said fibrous nonwoven mats, each of the fibrous nonwoven mats having a basis weight in the range of about 0.5 to about 6 lbs. per 100 sq. feet, one of the fibrous nonwoven mats having a basis weight that is at least about 4.1 lbs/100 sq. ft., and in the range of about 1.5 times to about 3 times the basis weight of another fibrous nonwoven mat in the laminate a bottom and top layer of the laminate being fibrous nonwoven mat comprised of at least about 70 wt. percent glass fibers and about 6 to about 10 wt. percent polymer fibers.

15. The laminate of claim 1 wherein one of the mats has a basis weight of at least 4 lbs. per 100 sq. ft. and wherein at least one of the mats contains a polymer fiber in amounts up to about 10 wt. percent of the dry mat.

16. The laminate of claim 1 wherein the outer layers, the top layer and bottom layer, of the laminate are glass fiber nonwoven mat containing about 70-74 wt. percent glass fibers and about 6-10 wt. percent polyester fibers, the top and bottom layers having a basis weight of about 2.3-2.6 lbs. per 100 sq. ft., each outer layer mat being bonded to a core fibrous nonwoven mat containing about 82-86 wt. percent glass fibers and having a basis weight of about 4.1-4.9 lbs. per 100 sq. ft. with the thermoplastic resinous film, the resinous film being polyethylene.

17. The laminate of claim 16 wherein at least one of the resinous films of thermoplastic polyethylene is derived from a film of thermoplastic polyethylene.

18. The laminate of claim 16 wherein at least one of the resinous films of thermoplastic polyethylene is derived from a layer of thermoplastic polyethylene particles.

19. The laminate of claim 1 wherein the outer layers, the top layer and bottom layer, of the laminate are glass fiber nonwoven mats containing about 70-74 wt. percent glass fibers and about 6-10 wt. percent polyester fibers and have a basis weight of about 2.3-2.6 lbs. per 100 sq. ft., each outer layer mat being bonded to a core fibrous nonwoven mat containing about 82-86 wt. percent glass fibers and having a basis weight of about 4.4-5.2 lbs. per 100 sq. ft. with a resinous film of thermoplastic polyethylene.

20. The laminate of claim 19 wherein at least one resinous film of polyethylene is derived from a film of thermoplastic polyethylene.

21. The laminate of claim 19 wherein at least one resinous film of polyethylene is derived from a layer of thermoplastic polyethylene particles.

22. The laminate of claim 1 wherein one outer layer of the laminate is a glass fiber nonwoven mat containing about 70-74 wt. percent glass fibers having an average fiber diameter of about 15-17 microns and about 6-10 wt. percent polyester fibers and have a basis weight of about 2.3-2.6 lbs. per 100 sq. ft., the other outer layer is a glass fiber nonwoven mat containing about 70-74 wt. percent glass fibers having an average fiber diameter of about 12-14 microns and about 6-10 wt. percent polyester fibers and a basis weight of about 2.3-2.6 lbs. per 100 sq. ft., each outer layer mat being bonded to, a core fibrous nonwoven mat containing about 82-86 wt. percent glass fibers and having a basis weight of about 4.4-5.2 lbs. per 100 sq. ft. with a resinous film of thermoplastic polyethylene.

23. The laminate of claim 22 wherein at least one of the resinous films of thermoplastic polyethylene is derived from a film of thermoplastic polyethylene.

24. The laminate of claim 22 wherein at least one of the resinous films of thermoplastic polyethylene is derived from a layer of polyethylene particles.

25. A laminate comprising at least three layers of fibrous nonwoven mats, fibers in each of the layers of fibrous nonwoven mats being locked together with a cured resin binder, in an amount of about 16 to about 20 wt. percent of the mat, at the fiber crossover locations, the binder selected from a group consisting of polyacrylic acid solution polymer and melamine solution polymer, the majority of the fibers in each of the fibrous nonwoven mats being glass fibers, the layers of mats bonded together with a thermoplastic resinous film between the mats, each thermoplastic resinous film being of a different polymer than the polymer or polymers in the cured resin binder bonding the fibers together in said fibrous nonwoven mats, each of the mats having a basis weight in the range of about 0.5 to about 6 lbs. per 100 sq. feet, one of the mats having a basis weight of at least about 4.1 lbs. per 100 sq. ft. and at least about 1.5 times the basis weight of another mat in the laminate, the thickness of the laminate being at least about 150 mils, the outer layers, the top layer and bottom layer, of the laminate being glass fiber nonwoven mat containing about 70-74 wt. percent glass fibers and about 6-10 wt. percent polyester fibers, the top and bottom layers having a basis weight of about 2.3-2.6 lbs. per 100 sq. ft, each outer layer mat being bonded to a core fibrous nonwoven mat containing about 82-86 wt. percent glass fibers and having a basis weight of about 4.1-4.9 lbs. per 100 sq. ft. with a thin resinous film of thermoplastic polyethylene.

26. The laminate of claim 25 wherein at least one of the thin resinous films is derived from a film of thermoplastic polyethylene.

27. The laminate of claim 25 wherein at least one of the thin resinous films is derived from a layer of thermoplastic polyethylene particles.

28. A laminate comprising at least three layers of fibrous nonwoven mats, the majority of the fibers in the mats being glass fibers and the fibers in each of the layers of fibrous nonwoven mats being locked together with a cured resin binder, in an amount of about 16 to about 20 wt. percent of the mat, at the fiber crossover locations, the binder selected from a group consisting of polyacrylic acid solution polymer and melamine solution polymer, the layers of fibrous nonwoven mats bonded together with a resinous film between the mats, each resinous film being of a different polymer than the polymer or polymers in the cured resin binder bonding the fibers together in said fibrous nonwoven mats, each of the fibrous nonwoven mats having a basis weight in the range of about 0.5 to about 6 lbs. per 100 sq. feet, one of the mats having a basis weight of at least about 4.1 lbs. per 100 sq. ft. and at least about 1.5 times the basis weight of another mat in the laminate, the thickness of the laminate being at least about 150 mils, the outer layers, a top layer and a bottom layer, of the laminate are glass fiber nonwoven mats containing about 70-74 wt. percent glass fibers and about 6-10 wt. percent polyester fibers and have a basis weight of about 2.3-2.6 lbs. per 100 sq. ft., each outer layer mat being bonded to a core fibrous nonwoven mat containing about 82-86 wt. percent glass fibers and having a basis weight of about 4.4-5.2 lbs. per 100 sq. ft. with a resinous film of thermoplastic polyethylene.

29. The laminate of claim 28 wherein at least one of the resinous films of thermoplastic polyethylene is derived from a film of thermoplastic polyethylene.

30. The laminate of claim 28 wherein at least one of the resinous films of thermoplastic polyethylene is derived from a layer of thermoplastic polyethylene particles.

31. A laminate comprising at least three layers of fibrous nonwoven mats, the majority of the fibers in the mats being glass fibers and the fibers in each of the layers of fibrous nonwoven mats being locked together with a cured resin binder, in an amount of about 16 to about 20 wt. percent of the mat, at the fiber crossover locations, the binder selected from a group consisting of polyacrylic acid solution polymer and melamine solution polymer, the layers of fibrous nonwoven mats bonded together with a thermoplastic resinous film between the fibrous nonwoven mats, each thermoplastic resinous film being a different polymer than the polymer or polymers in the cured resin binder bonding the fibers together in said fibrous nonwoven mats, each of the fibrous nonwoven mats having a basis weight in the range of about 0.5 to about 6 lbs. per 100 sq. feet, one of the mats having a basis weight of at least about 4.1 lbs. per 100 sq. ft. and at least about 1.5 times the basis weight of another mat in the laminate, the thickness of the laminate being at least about 150 mils, one outer layer of the laminate being a glass fiber nonwoven mat containing about 70-74 wt. percent glass fibers having an average fiber diameter of about 15-17 microns and about 6-10 wt. percent polyester fibers and having a basis weight of about 2.3-2.6 lbs. per 100 sq. ft., the other outer layer being a glass fiber nonwoven mat containing about 70-74 wt. percent glass fibers having an average fiber diameter of about 12-14 microns and about 6-10 wt. percent polyester fibers and a basis weight of about 2.3-2.6 lbs. per 100 sq. ft., each cuter layer mat being bonded to a core fibrous nonwoven mat containing about 82-86 wt. percent glass fibers and having a basis weight of about 4.4-5.2 lbs. per 100 sq. ft. with the resinous film of thermoplastic polyethylene.

32. The laminate of claim 31 wherein at least one of the resinous films of thermoplastic polyethylene is derived from a film of thermoplastic polyethylene.

33. The laminate of claim 28 wherein at least one of the resinous films of thermoplastic polyethylene is derived from a layer of thermoplastic polyethylene particles.

* * * * *